(12) United States Patent
Gurevich et al.

(10) Patent No.: US 8,330,645 B2
(45) Date of Patent: Dec. 11, 2012

(54) RADAR ACTIVATION MULTIPLE ACCESS SYSTEM AND METHOD

(75) Inventors: Marina Gurevich, Huntington Beach, CA (US); Deanna K. Harden, Fontana, CA (US)

(73) Assignee: Raytheon Company, Waltham, MA (US)

( * ) Notice: Subject to any disclaimer, the term of this patent is extended or adjusted under 35 U.S.C. 154(b) by 283 days.

(21) Appl. No.: 12/873,032

(22) Filed: Aug. 31, 2010

(65) Prior Publication Data

US 2012/0050089 A1   Mar. 1, 2012

(51) Int. Cl.
*G01S 13/00* (2006.01)
(52) U.S. Cl. .......................................................... 342/59
(58) Field of Classification Search ...................... 342/59
See application file for complete search history.

(56) References Cited

U.S. PATENT DOCUMENTS

| | | | |
|---|---|---|---|
| 5,130,715 A * | 7/1992 | Yanagisawa | 342/158 |
| 8,068,051 B1 * | 11/2011 | Osterweil | 342/28 |
| 2002/0093956 A1 | 7/2002 | Gurin | |
| 2004/0075605 A1 * | 4/2004 | Bradford et al. | 342/95 |
| 2007/0136496 A1 | 6/2007 | Hendel et al. | |
| 2008/0143587 A1 | 6/2008 | Johnson | |
| 2008/0165046 A1 * | 7/2008 | Fullerton et al. | 342/21 |

FOREIGN PATENT DOCUMENTS

| WO | WO-2009/140143 A1 | 11/2009 |
|---|---|---|
| WO | WO-2010/088133 A1 | 8/2010 |
| WO | WO-2012/030666 A2 | 3/2012 |

OTHER PUBLICATIONS

"International Application Serial No. PCT/US2011/049437, International Search Report mailed Mar. 28, 2012", 3 pgs.
"International Application Serial No. PCT/US2011/049437, Written Opinion mailed Mar. 28, 2012", 3 pgs.

* cited by examiner

*Primary Examiner* — Timothy A Brainard
(74) *Attorney, Agent, or Firm* — Schwegman Lundberg & Woessner, P.A.

(57) ABSTRACT

A radar activation multiple access system and method is provided that includes a plurality of radar participant nodes wirelessly connected and forming a radar network and a multiple access unit in communication with the radar network. The multiple access unit includes a scheduler component, a synch component, a priority component and a radar activation component. The scheduler component is configured to schedule a period of operation having a plurality of time divisions within the period of operation. The synch component is configured to synchronize the radar participant nodes within the period of operation. The priority component is configured to assign a priority to individual radar participant nodes in the radar network. The radar activation component is communicatively connected to the radar network and configured to determine a contentious state at a time division in the period of operation. The radar activation component instructs individual nodes to assume the role of transmitter or receiver based on the assigned priority.

13 Claims, 4 Drawing Sheets

RADAR ACTIVATION MULTIPLE ACCESS SYSTEM AND METHOD

BACKGROUND OF THE INVENTION

1. Field of the Invention

The present invention generally relates to radar activation. More specifically, the present invention relates to radar activation multiple access for a plurality of nodes.

2. Background Information

Multistatic radar and a subset, Multiple Input Multiple Output (MIMO) radar, are becoming increasingly popular radar systems. The MIMO or multistatic radar uses multiple radar apertures, functioning as either a transmitter or a receiver at a given time period. In any given system, there can be a single transmitter with multiple receivers, a single receiver with multiple transmitters or multiple transmitters and multiple receivers. The apertures are widely dispersed or closely spaced within a vicinity. Because of the number and location of transmitters and/or receivers, the problem of sharing a limited space and channel access arises.

MIMO or multistatic radar systems are equipped with a scheduling methodology to determine which of the multiple independent radar apertures function as a transmitter or receiver and for how long. Typically, the scheduling of the transmitters and receivers takes place via a sequential handshaking with problems of latency and loss. Furthermore, there is the issue of fairness and quality of signals. That is, due to shortcomings in the algorithm for selection, role designation and scheduling of the various apertures, the algorithm favors apertures over others and thus, fails to beneficially utilize all of the apertures.

In addition, in some radar systems, MIMO or multistatic radar systems are not utilized until such a session is requested. The initiation, coordination and setup of transmitters and receivers cause a detectable traffic exchange between apertures. That is, the amount of traffic changes and even spikes upwards just before a radar mission, thereby disadvantageously signaling the radar mission.

In view of the above, it will be apparent to those skilled in the art from this disclosure that there exists a need for an improved system and method that provides radar activation multiple access. This invention addresses this need in the art as well as other needs, which will become apparent to those skilled in the art from this disclosure.

SUMMARY OF THE INVENTION

The present invention facilitates use of a common channel in a radar network. A radar activation multiple access system is provided that comprises a plurality of radar participant nodes wirelessly connected and forming a radar network and a multiple access unit in communication with the radar network. The multiple access unit includes a scheduler component, a synch component, a priority component and a radar activation component. The scheduler component is configured to schedule a period of operation having a plurality of time divisions within the period of operation. The synch component is configured to synchronize the radar participant nodes within the period of operation. The priority component is configured to assign a priority to individual radar participant nodes in the radar network. The radar activation component is communicatively connected to the radar network and configured to determine a contentious state at a time division in the period of operation. The radar activation component instructs individual nodes to assume the role of transmitter or receiver based on the assigned priority.

A radar activation multiple access method is provided that basically comprises defining a radar network with a plurality of radar participant nodes wirelessly connected; scheduling at least one period of operation having a plurality of time divisions within the period of operation; synchronizing the radar participant nodes within the period of operation; assigning a priority to individual radar participant nodes in the radar network; determining a contentious state at a time division in the period of operation; determining the radar participant node with the highest assigned priority; and instructing the radar participant node with the highest priority to assume the role of transmitter and instructing the remaining radar participant nodes to assume the role of a receiver.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
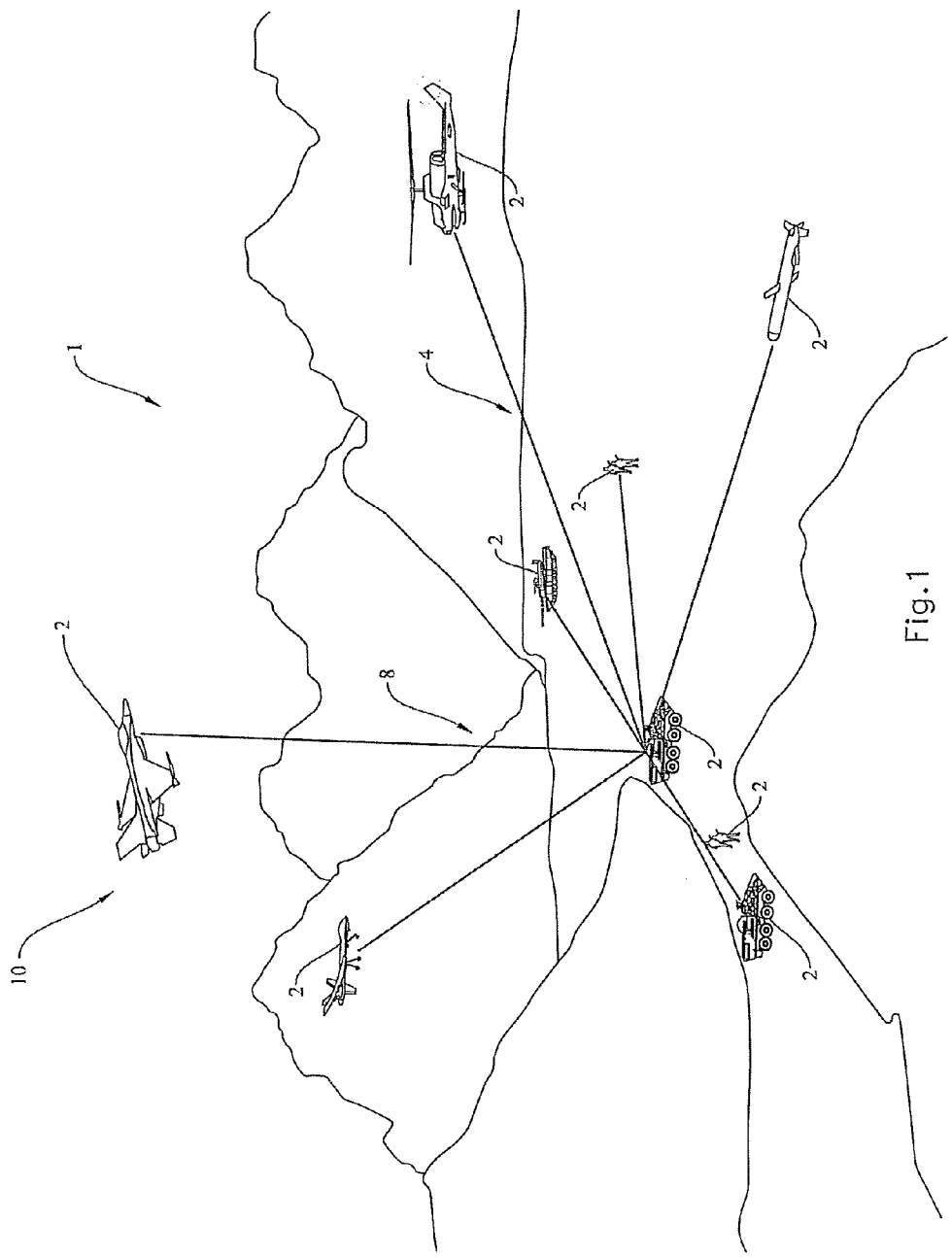
FIG. 1 is a schematic of a radar activation multiple access system showing examples of participants having radar nodes in a radar network for transmitting and receiving according to an embodiment of the present invention.

Referring initially to FIG. 1, a radar activation multiple access system is illustrated in accordance with a first embodiment of the present invention and is designated generally as 1. The system 1 includes a plurality of radar participant nodes 2 in a wireless communication network 4 and a multiple access unit 6. The radar participant node 2 can exist alone or can be an integral part of a participant, wherein the participant is a vehicle, aircraft, missile or person, for example. The radar participant nodes 2 are communicatively connected in the wireless communication network 4 and are able to determine their neighbors in a neighborhood forming the wireless communication network 4 by exchanging the necessary information with each other as is well known in the art. Preferably, the radar participant nodes 2 are in a 2-hop topology. As the radar participant nodes 2 are radar nodes, the plurality of radar participant nodes 2 have omnidirectional radar transceivers and constitute a radar network 8 with a shared area of coverage 10.

It will be apparent to one of ordinary skill in the art from this disclosure that, while the multiple access unit 6 is shown separate from the wireless network 4, the multiple access unit 6 can be integrated into a central radar participant node 2 or the components of the multiple access unit 6 can be separated into radar participant nodes 2 throughout the network 4. In other words, the multiple access unit 6 does not have to be a physically separate unit from the radar participant node(s) 2 and can be embodied in various ways, as will become apparent to one of ordinary skill in the art from this disclosure.

The present invention develops and implements an activation schedule for a plurality of nodes 2 accessing a common channel within the wireless network 4. The activation schedule indicates whether a particular node 2 within the plurality of radar participant nodes 2 in the radar network 8 with a shared area 10 of coverage should function as a transmitter or as a receiver to avoid simultaneous transmissions.

Figure 3:
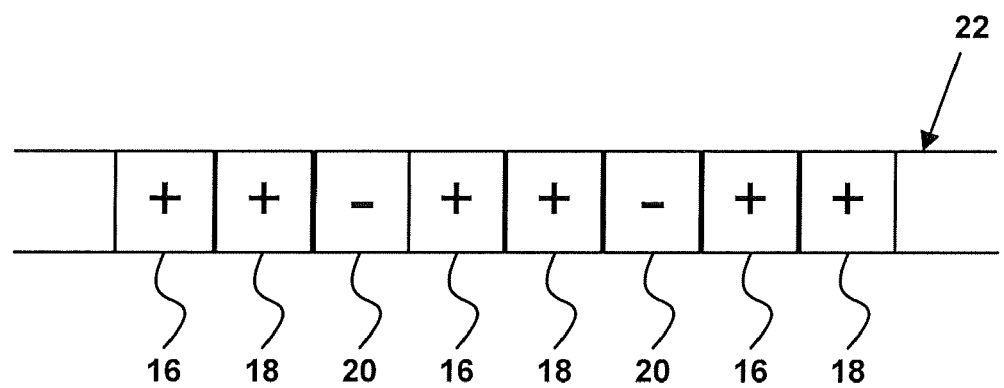
FIG. 3 is a schematic of a synchronized period or operation in accordance with an embodiment of the present invention.

To develop and implement the active schedule, the multiple access unit 6 includes a synchronization component 12 and a scheduler component 14. The synchronization component 12 is configured to synchronize the radar participant nodes 2 and time divisions 16, 18, 20 over a period of operation 22. The synch component 14 accomplishes synchronization by utilizing a GPS clock signal, for example. The scheduler component 14 is a data scheduler configured to schedule the periods of operation 22 and other uses of the time divisions 20. The scheduler component 14 can schedule the periods of operation 22 pseudo randomly or periodically. The scheduler component 14 is further configured to schedule when the synchronization component 12 needs to perform future synchronizations. Referring to FIG. 3, a period of operation 22 can be represented as a set of time divisions 16, 18. In the illustrated period of operation 22, time divisions 16, 18 utilized by the multiple access unit 6 are indicated with a "+" and every third slot, indicated with "−", is a time division 20 allocated to another schedule not serviced by the present invention. The time divisions 16, 18, 20 can vary in length of time or can be equal units of time. It will be apparent to one of ordinary skill in the art from this disclosure that the multiple access unit 6 can utilize all of the time divisions 16, 18, 20 in a period of operation 22 or utilize time divisions 16, 18, 20 in patterns other than that shown in FIG. 3.

The synch component 12 and the scheduler component 14 are operatively connected to share data needed for operation. For example, the scheduler component 14 can notify the synch component 12 of the periods of operation 22 mapped out in time by the scheduler component 14 and divide the periods into time divisions 16, 18, 20 for use by the radar participant nodes 2. The synch component 12 can then synchronize a plurality of the radar participant nodes 2 so that they are all apprised of the time divisions 16, 18, 20 and the opportunities to transmit. Utilizing the present invention, all participants will know their roles at every time division until the next synchronization period.

During operation of the radar network 8, the nodes 2 share a common channel and therefore must take turns transmitting in the radar network 8. In the embodiment shown, the synch component 12 and the scheduler 14 have configured a period of operation 22 for the nodes 2 to transmit between every third time division 20. However, if more than one node 2 signals to the multiple access unit 6 that they intend to transmit in the same time division 16, a contentious state occurs. The present invention advantageously solves the contentious state by avoiding simultaneous transmissions that could cause collisions. The present invention is also advantageous because it provides an unbiased sharing of network bandwidth and facilitates constant bandwidth utilization.

Figure 2:
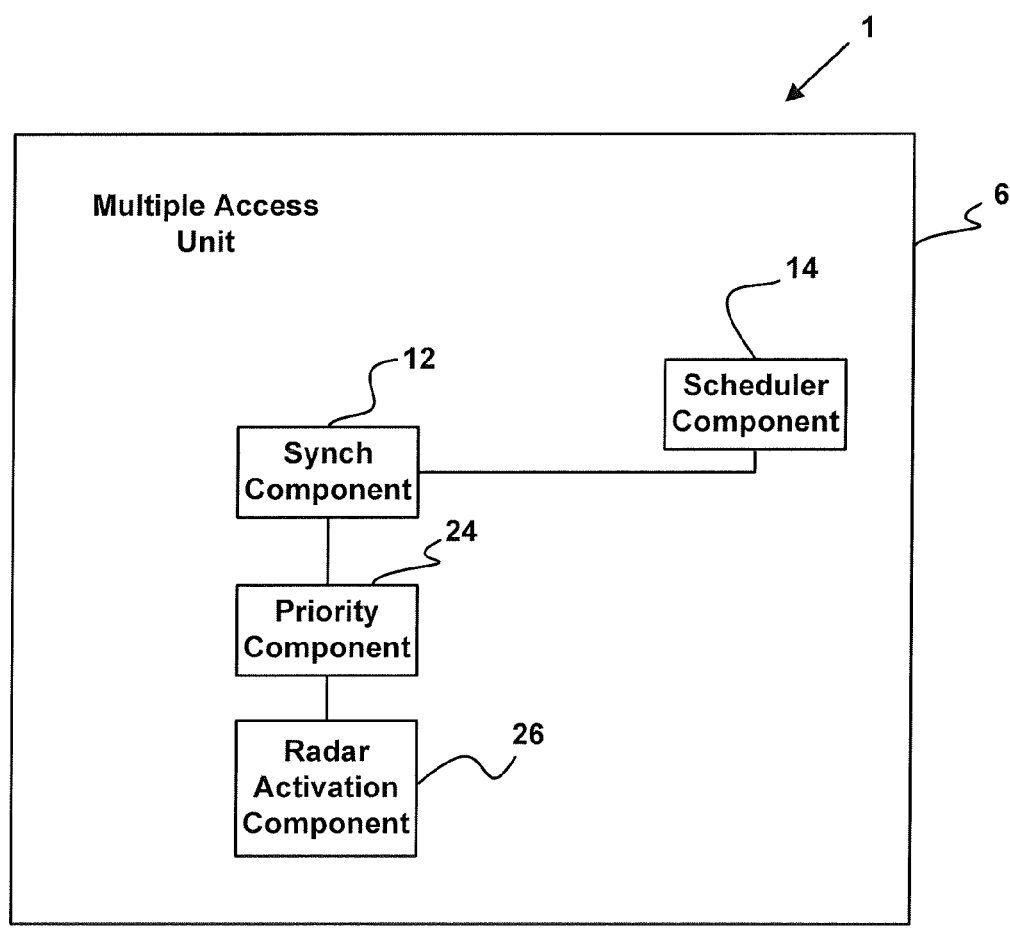
FIG. 2 is a schematic of a multiple access unit of the radar activation multiple access system according to an embodiment of the present invention.

The multiple access unit 6 further includes a priority component 24 and a radar activation component 26 in communication with the priority component 24. The priority component 24 establishes the level of priority that each of the nodes 2 have in the radar network 8 for a given time division 16, 18. In the embodiment shown in FIG. 2, the priority component 24 includes a pseudo random number generator and assigns a pseudo random, unique priority number to each node 2 in the radar network 8.

The radar activation component 26 is communicatively connected to the radar participant nodes 2 and is configured to implement the priorities created by the priority component. That is, in the event of a contentious state between two or more nodes 2, the radar activation component 26 signals the node 2 with the highest priority number to transmit and signals the remaining nodes 2 to yield and receive radar transmissions. That is, by virtue of the highest unique priority number, which was pseudo randomly assigned, the "winning" node 2 assumes the role of a transmitter and all other nodes 2 in the radar network 8, including the node 2 that "lost" in the contentious state, assume the role of a receiver for that time division. The radar activation component 26 is further configured to handle necessary communications with the radar network 8 and preferably includes one or more transceivers to communicate with one or more nodes 2. The radar activation component 26 is configured to use the transceiver to instruct the nodes 2 to assume the role of transmitter or receiver, as well as use in other communications. The node 2 that lost would then transmit in the immediately subsequent time division 18, assuming that another node 2 does not intend to transmit. Should there be two or more nodes 2 intending to transmit in the immediately subsequent time division 18, the radar activation component 26 will instruct the node 2 with the highest priority number to transmit. This limits bias toward any one node 2 and therefore avoids under utilization of nodes 2 since the priority numbers are pseudo randomly assigned.

The individual nodes 2 possess a unique participant identification number to identify the individual nodes 2 and assign the unique priority numbers. The unique participant identification number can be assigned by the priority component 24 or the radar activation component 26, for example. Alternatively, the nodes 2 have a unique pre-assigned identification number that is obtained by the radar activation component 26. For example, the node 2 has a transponder function and transmits its participant's identity through secondary surveillance radar to the radar activation component 26, for example.

Figure 4:
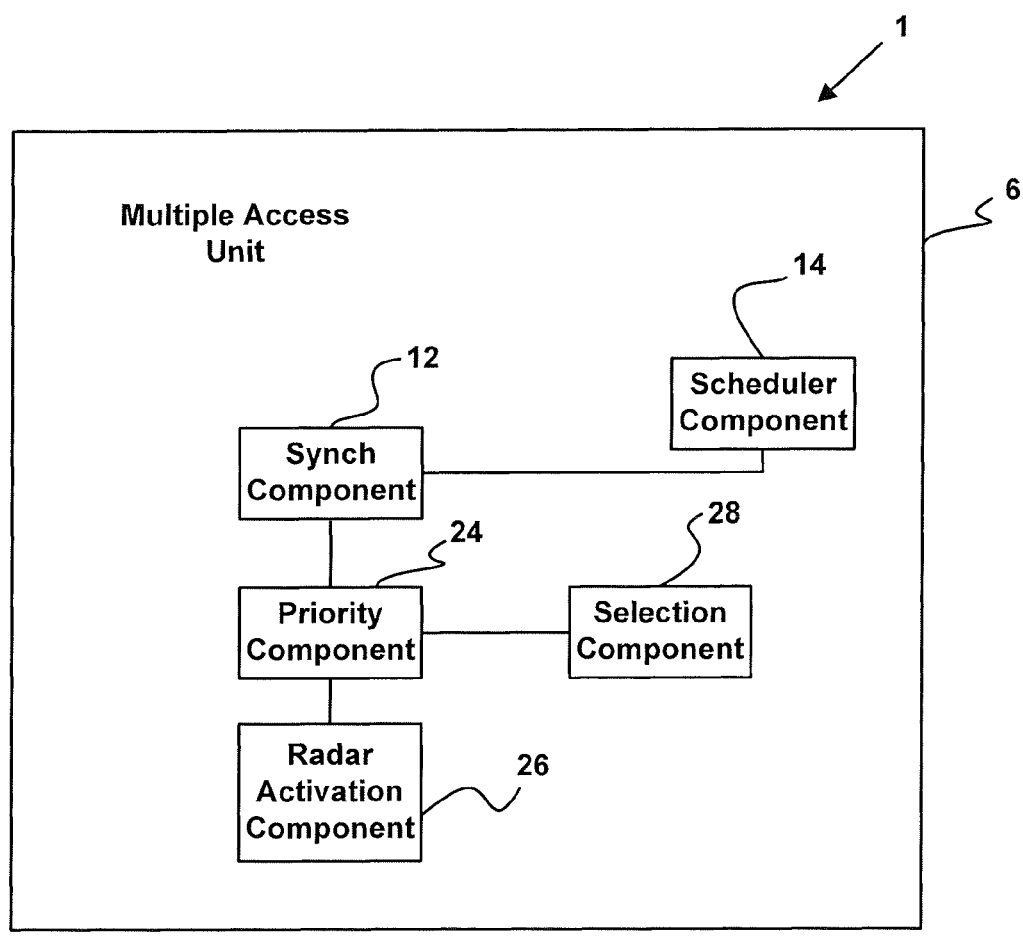
FIG. 4 is a schematic of a multiple access unit of the radar activation multiple access system according another embodiment of the present invention.

Referring to FIG. 4, in another embodiment of the present invention, the multiple access unit 6 includes a selection component 28 that is in communication with the priority component 24. In some circumstances, the nodes 2 may possess optimal attributes that were unknown to the priority component 24 at the time of priority number assignment. The selection component 28 utilizes pre-defined criteria to reassign or modify priority numbers according to the known optimal attributes. For example, the selection component 28 may include a selection algorithm that is configured for determining the priority of nodes 2 with one or more desired optimal attributes. The selection component 28 may also possess an interface for modification of the algorithm to adapt to changing circumstances in the coverage area 10. The optimal attribute can be a beneficial position of the node 2 in the coverage area 10, battery life of the node 2, power source of the node 2, or operability, for example. The selection component 28 is configured to collaborate with the priority component 24 and modify the assigned priority numbers up or down based on the optimal attributes. For example, if the selection component 28 detects that a node 2 with a low priority number is located at a beneficial position, the selection component 28 will instruct the priority component 24 to raise the priority number.

The present invention eliminates the need to schedule the mission ahead of time. For complex cases where there may be more than two participant nodes 2 contending for the same time slot/division, the scheduling duration is much shorter. Furthermore, the information for implementing the system 1 and method is distributed in a continuous manner, thereby shortening the timeline required to determine which node 2 transmits and which nodes 2 receive. The system 1 and method is continually updating necessary information and is able to provide the determination of the transmittal role and the receiver role without having to wait for responses from remote platforms because the information is already available within the multiple access unit 6.

The system 1 and method is also able to provide a current known state for all participants. By continuously distributing state information, detectable traffic exchange between participants does not vary, providing the appearance of a featureless data exchange that is more difficult to detect because the amount of traffic does not change, e.g., does not spike upwards just before a radar mission.

The multiple access unit 6 preferably includes a microcomputer with a control program that controls the components 12, 14, 24, 26, 28 discussed above. The multiple access unit 6 can also include other conventional components such as an input interface circuit, an output interface circuit, and a memory circuit having storage devices such as a ROM (Read Only Memory) device and a RAM (Random Access Memory) device. The memory circuit stores processing results and control programs such as ones for operation of the components. The multiple access unit 6 is capable of selectively controlling any of the components of the multiple access unit 6 in accordance with the control program. It will be apparent to those skilled in the art from this disclosure that the precise structure and algorithms for the multiple access unit 6 can be any combination of hardware and software that will carry out the functions of the present invention. Features of the present invention as described herein should include any structure or hardware and/or algorithm or software that can be utilized to carry out the function of the features.

In understanding the scope of the present invention, the term "configured" as used herein to describe a component, unit or part of a device includes hardware and/or software that is constructed and/or programmed to carry out the desired function. In addition, the term "comprising" and its derivatives, as used herein, are intended to be open ended terms that specify the presence of the stated features, elements, components, parts of a device, and/or steps, but do not exclude the presence of other unstated features, elements, components, parts of a device and/or steps. The foregoing also applies to words having similar meanings such as the terms, "including", "having" and their derivatives. Also, the terms "component," "unit," or "device" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A radar activation multiple access system comprising:
a plurality of radar participant nodes wirelessly connected and forming a radar network; and
a multiple access unit in communication with the radar network and including
a scheduler component configured to schedule a period of operation having a plurality of time divisions within the period of operation,
a synch component configured to synchronize the radar participant nodes within the period of operation,
a priority component configured to assign a priority to individual radar participant nodes in the radar network, and
a radar activation component communicatively connected to the radar network and configured to determine a contentious state at a time division in the period of operation and instruct individual nodes to assume the role of transmitter or receiver based on the assigned priority.

2. The system of claim 1, wherein
the assigned priority is a pseudo randomly generated number that is unique among the radar participant nodes in the radar network.

3. The system of claim 1, wherein
the multiple access unit further includes a selection component that adjusts the priority of two or more radar participant nodes based on optimal attributes of one or more radar participant nodes.

4. The system of claim 3, wherein
the adjustment of the priority is based on a pre-defined selection algorithm.

5. The system of claim 3, wherein
the adjustment is based on information about a coverage area of the radar network.

6. The system of claim 1, wherein
the priority component or the radar activation component is configured to assign a unique identification number to the individual radar participant nodes in the radar network.

7. The system of claim 1, wherein
the synchronization component utilizes GPS clock information to synchronize the radar participant nodes with the period of operation.

8. The system of claim 1, wherein
the participant nodes are wirelessly connected in a wireless network with a 2-hop topology.

9. A radar activation multiple access method comprising:
defining a radar network with a plurality of radar participant nodes wirelessly connected;
scheduling at least one period of operation having a plurality of time divisions within the period of operation;
synchronizing the radar participant nodes within the period of operation;
assigning a priority to individual radar participant nodes in the radar network;
determining a contentious state at a time division in the period of operation;
determining the radar participant node with the highest assigned priority; and
instructing the radar participant node with the highest priority to assume the role of transmitter and instructing the remaining radar participant nodes to assume the role of a receiver.

10. The method of claim 9, wherein
the assigning includes assigning a pseudo randomly generated number that is unique among the radar participant nodes in the radar network.

11. The method of claim 9, wherein
the assigning includes adjusting the priority of two or more radar participant nodes based on optimal attributes of one or more radar participant nodes.

12. The method of claim 11, wherein
the adjusting the priority includes basing adjustment on a pre-defined selection algorithm.

13. The method of claim 11, wherein
the adjusting the priority includes basing adjustment on information about a coverage area of the radar network.

* * * * *

UNITED STATES PATENT AND TRADEMARK OFFICE
CERTIFICATE OF CORRECTION

PATENT NO.        : 8,330,645 B2                    Page 1 of 1
APPLICATION NO.   : 12/873032
DATED             : December 11, 2012
INVENTOR(S)       : Gurevich et al.

It is certified that error appears in the above-identified patent and that said Letters Patent is hereby corrected as shown below:

In the Specification

Column 3, line 15, delete "14" and insert --12--, therefor

Column 3, line 52, after "scheduler", insert --component--, therefor

In the Claims

Column 6, line 6, in Claim 1, after "including", insert --:--, therefor

Signed and Sealed this
Twenty-fifth Day of November, 2014

Michelle K. Lee
*Deputy Director of the United States Patent and Trademark Office*